United States Patent
Yoshida

(10) Patent No.: US 7,057,755 B2
(45) Date of Patent: Jun. 6, 2006

(54) COMMUNICATION METHOD AND APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 919 days.

(21) Appl. No.: 09/759,232

(22) Filed: Jan. 16, 2001

(65) Prior Publication Data
US 2002/0051173 A1 May 2, 2002

(30) Foreign Application Priority Data
Jan. 20, 2002 (JP) ............................. 2000-012125

(51) Int. Cl.
G06K 15/00 (2006.01)
H04M 11/00 (2006.01)

(52) U.S. Cl. .................... 358/1.15; 358/400; 358/1.18; 379/100.08

(58) Field of Classification Search ............... 358/1.15, 358/402, 403, 407, 440, 442, 443, 468, 400, 358/401, 1.16, 1.18; 379/93.05, 93.07, 100.01, 379/100.08, 100.09, 100.04, 100.06, 100.12, 379/100.17
See application file for complete search history.

(56) References Cited

U.S. PATENT DOCUMENTS

| | | | | |
|---|---|---|---|---|
| 5,748,915 A | * | 5/1998 | Iijima | 710/105 |
| 5,805,298 A | | 9/1998 | Ho et al. | 358/402 |
| 5,943,140 A | * | 8/1999 | Monroe | 358/442 |
| 6,005,677 A | * | 12/1999 | Suzuki | 358/442 |
| 6,058,169 A | * | 5/2000 | Bramnick et al. | 379/100.01 |
| 6,061,149 A | * | 5/2000 | Hosokawa et al. | 358/442 |
| 6,226,365 B1 | * | 5/2001 | Mashinsky | 379/114.02 |
| 6,259,538 B1 | * | 7/2001 | Amit et al. | 358/442 |
| 6,381,038 B1 | | 4/2002 | Endo | 358/400 |
| 6,384,927 B1 | * | 5/2002 | Mori | 358/1.15 |
| 6,424,425 B1 | * | 7/2002 | Otsuka | 358/1.15 |
| 6,438,605 B1 | * | 8/2002 | Idehara | 709/238 |
| 6,483,600 B1 | * | 11/2002 | Schuster et al. | 358/1.15 |

(Continued)

FOREIGN PATENT DOCUMENTS

EP 0887995 A2 12/1998

(Continued)

OTHER PUBLICATIONS

International Telecommunication Union, "Procedures for real-time Group 3 facsimile communication over IP networks", ITU-T Recommendation T-38, Jun. 1998, pp. 1-24.

Primary Examiner—Jerome Grant, II
(74) Attorney, Agent, or Firm—Fitzpatrick, Cella, Harper & Scinto

(57) ABSTRACT

A communication method and a communication apparatus for smooth facsimile data transmission in both of facsimile communication via the Internet and facsimile communication without the Internet. In a case where facsimile communication via the Internet based on the ITU-T Recommendation T.38 is selected in a FAX 100 and data is transmitted to a FAX 108, the upper limit of communication speed is set to 14.4 kb/s, a T4 timer is set to 4 sec, and a T2 timer is set to 8 sec. On the other hand, in a case where facsimile communication only via a PSTN which is not based on the ITU-T Recommendation T.38 is selected in the FAX 100 and communication is performed to a FAX 110, the communication speed up to 33.6 kb/s without upper limit can be performed. Further, the T4 timer is set to 3 sec and T2 timer is set to 6 sec in conformity with the ITU-T Recommendation T.30.

12 Claims, 10 Drawing Sheets

U.S. PATENT DOCUMENTS

| | | | |
|---|---|---|---|
| 6,522,429 B1 * | 2/2003 | Endo | 358/400 |
| 6,563,599 B1 * | 5/2003 | Whitfield | 358/1.15 |
| 6,657,743 B1 * | 12/2003 | Otsuka et al. | 358/1.15 |
| 6,744,535 B1 * | 6/2004 | Chimura et al. | 358/407 |
| 6,888,796 B1 * | 5/2005 | Iizuka | 370/232 |
| 6,927,878 B1 * | 8/2005 | Bei et al. | 358/402 |

FOREIGN PATENT DOCUMENTS

| | | |
|---|---|---|
| EP | 0917340 A2 | 5/1999 |
| EP | 0949797 A2 | 10/1999 |
| JP | 11-308428 A | 11/1999 |
| WO | WO 98/28892 | 7/1998 |

* cited by examiner

COMMUNICATION METHOD AND APPARATUS

FIELD OF THE INVENTION

The present invention relates to a communication method and a communication apparatus.

BACKGROUND OF THE INVENTION

Conventionally, communication apparatuses which selectively perform facsimile communication via the Internet and facsimile communication without the Internet are known. For example, a facsimile apparatus which selectively performs facsimile communication via the Internet in conformance with the ITU-T Recommendation T.38 and normal facsimile communication via a PSTN (Public Switched Telephone Network) are known.

In prior facsimile apparatus, in any case of facsimile communication via the Internet and facsimile communication without the Internet, communication parameters such as transmission speed and delay time are fixed.

For example, in the facsimile communication via the Internet in conformity with the ITU-T Recommendation T.38 and in the normal facsimile communication via the PSTN, facsimile communication is performed with the communication parameters fixed to values based on the ITU-T Recommendation T.30.

However, in the conventional art, upon execution of facsimile communication via the Internet, there is an occurrence of a delay caused by the Internet. In addition, PSTN communication between a facsimile apparatus at the transmitting side and an emitting gateway, and PSTN communication between a receiving gateway and a facsimile apparatus at the receiving side result in doubling the PSTN communication via modems. This results in communication errors being increased in comparison with the normal facsimile communication via a PSTN.

SUMMARY OF THE INVENTION

The present invention has been made to solve the above conventional problems, and has its object to provide a communication method and a communicant apparatus for performing smooth facsimile data transmission in both of facsimile communication via the Internet and facsimile communication without the Internet.

According to the present invention, the foregoing object is attained by providing a communication method for selectively performing real time facsimile communication via the Internet and facsimile communication without the Internet, wherein a communication parameter is changed based on whether the facsimile communication via the Internet or the facsimile communication without the Internet is to be performed, the parameter being allowable delay time.

It is preferable that the communication method further comprises a detection step of detecting whether the facsimile communication is performed via the Internet or the facsimile communication without the Internet. Further, it is preferable that the communication method further comprises a determination step of determining whether the facsimile communication via the Internet or the facsimile communication without the Internet is to be performed, based on information inputted by a user.

Preferably, in the communication method, at the determination step, upon call origination, it is determined whether the facsimile communication via the Internet or the facsimile communication without the Internet is to be performed, based on the call destination.

Preferably, in the communication method, at the determination step, upon reception of incoming call, it is determined whether the facsimile communication via the Internet or the facsimile communication without the Internet is to be performed, based on the originator telephone number information.

Further, according to the present invention, the foregoing object is attained by providing a communication apparatus capable of real time facsimile communication via the Internet, comprising: communication unit, adapted to perform communication; and changing means for changing a communication parameter used by said communication unit, based on whether the real time facsimile communication via the internet or facsimile communication without the Internet is to be performed.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings. Note that relative arrangement, expressions, numerical values and the like, unless specifically described, do not pose any limitation on the scope of the invention.

First Embodiment

Figure 1:
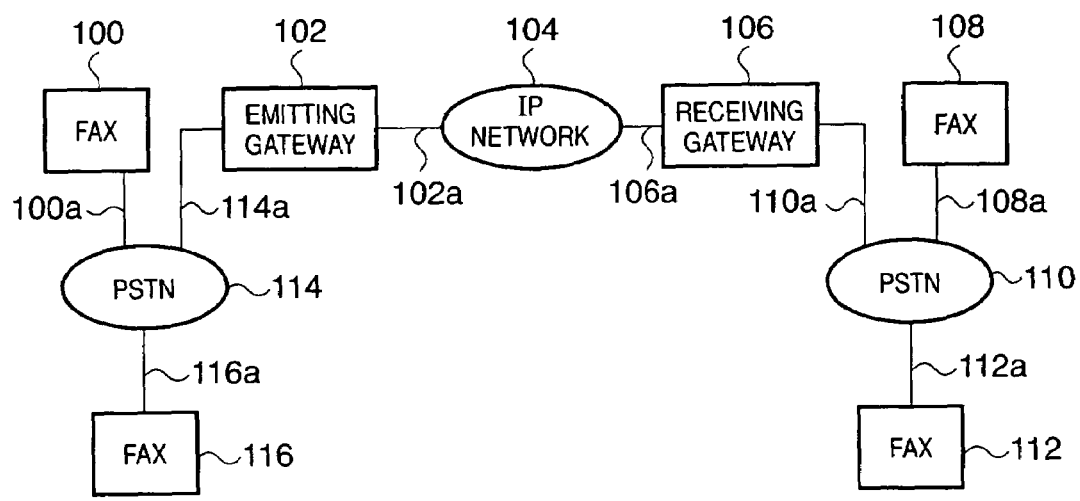
FIG. 1 is a block diagram showing an information processing system which applies a facsimile apparatus according to a first embodiment of the present invention.

FIG. 1 is a block diagram showing an information processing system to which a facsimile apparatus as a communication apparatus according to a first embodiment of the present invention is applied. The system performs facsimile communication based on the ITU-T Recommendation T.38.

In the figure, a FAX (facsimile) 100 and a FAX 116 are connected to a PSTN 114 via signal lines 100a and 116a. FAXes 108 and 112 are connected to a PSTN 110 via signal lines 108a and 112a.

Further, the PSTN 114 is connected to an emitting gateway 102 via a signal line 114a, and the PSTN 116 is connected to a receiving gateway 106 via a signal line 110a.

The emitting gateway 102 and the receiving gateway 106 are connected, respectively via signal lines 102a and 106a, to an IP network 104.

In a case where facsimile communication via the Internet based on the ITU-T Recommendation T.38 is selected in the FAX 100 and data is transmitted to the FAX 108, the upper limit of the transmission speed is 14.4 kb/s, and a T4 timer is set to 4 sec and a T2 timer is set to 8 sec. On the other hand, in a case where facsimiles communicate only via the PSTN, which is not based on the ITU-T Recommendation T.38, is selected in the FAX 100 and communication with the FAX 110 is performed, communication at a communication speed up to 36.6 kb/s without upper limit is possible, and further, the T4 time is set to 3 sec and the T2 timer is set to 6 sec as in the ITU-T Recommendation T.30.

Figure 2:
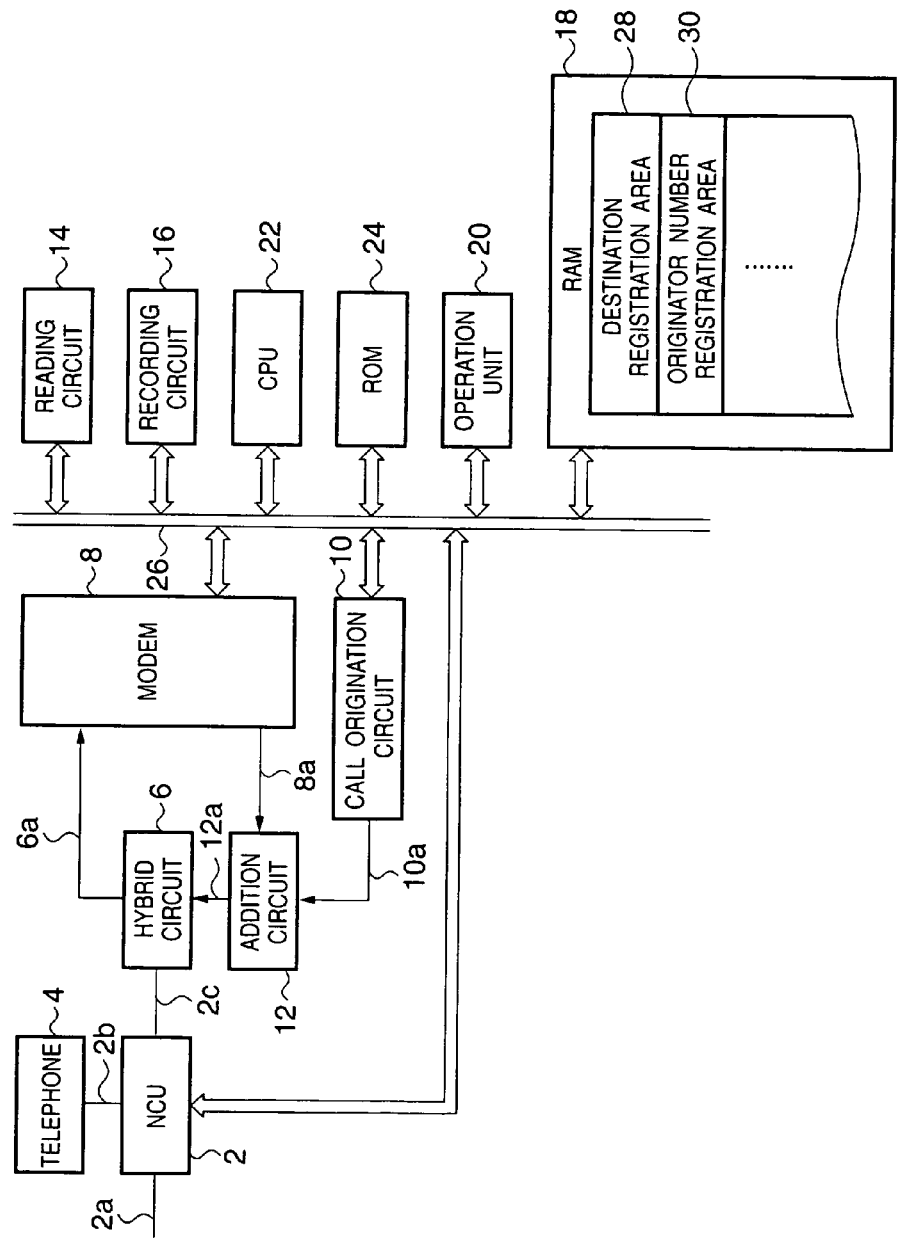
FIG. 2 is a block diagram showing a facsimile apparatus according to the first embodiment.

FIG. 2 is a block diagram showing the construction of the FAX 100. The other FAXes constituting the system have the same construction.

For use of telephone network in data communication or the like, an NCU (Network Control Unit) 2 connected to a terminal of a line controls connection to a telephone switching network, performs switching to a data communication path, and holds a loop. The NCU 2 connects a telephone line 2b to the telephone side (CML off) or connects the telephone line 2a to a facsimile apparatus side line 2c (CML on) by control from a bus 26. Note that under normal circumstances, the telephone line 2a is connected to the telephone 4 side.

A hybrid circuit 6 separates transmission type signals from reception-type signals. The hybrid circuit 6 transmits a transmission signal from an addition circuit 12 via the NCU 2 to the telephone line 2a, and receives a signal from the opposite side via the NCU 2 and sends the signal via a signal line 6a to a modulator-demodulator (modem) 8.

The modem 8 performs modulation and demodulation based on the ITU-T Recommendations V.8, V.21, V.27ter, V.29, V.17 and V.34. In the modem, the transmission mode is designated by control via the bus 26. The modem 8 inputs a transmission signal from the bus 26, outputs modulated data to a signal line 8a, then inputs a reception signal outputted to the signal line 6a, and outputs modulated data to the bus 26.

In accordance with a signal from the bus 26, a call origination circuit 10 inputs telephone number information and outputs a DTMF selection signal to a signal line 10a. The addition circuit 12 inputs the information from the signal line 8a and from the signal line 10a, and outputs the result of addition to a signal line 12a. A reading circuit 14 outputs read data to the bus 26. A recording circuit 16 sequentially records information outputted on the bus 26.

A RAM 18 serves as a work memory and as a memory for storing original information of read data, coded information, reception information, decoded information and the like, via the bus 26. The memory 18 includes a destination registration area 28 for registering a destination (communication based on the Recommendation T.38 is performed upon call origination to this destination) and an originator number registration area 30 for registering an originator telephone number (communication based on the Recommendation T.38 is performed upon reception of incoming call from this destination).

Numeral 20 denotes an operation unit having single-touch dialing keys, abbreviated dialing keys, ten keys, "*" and "#" keys, a start key, a set key, a stop key, a key for selecting T.38 facsimile communication, a key for registration into the areas 28 and 30 and other function keys. Information of depressed key is outputted to the bus 26.

A CPU (Central Processing Unit) 22 performs control on the apparatus main body and a facsimile transmission control procedure, and further, performs realtime facsimile communication based on the ITU-T Recommendation T.38. The control programs are stored in a ROM 24.

Next, the flow of gateway control according to the present embodiment will be described with reference to FIGS. 3 to 7. FIGS. 3 to 7 are flowcharts showing a process procedure in the FAX 100. A program for performing the processing shown in the flowcharts is stored in the ROM 24 and is executed by the CPU 22.

Figure 3:
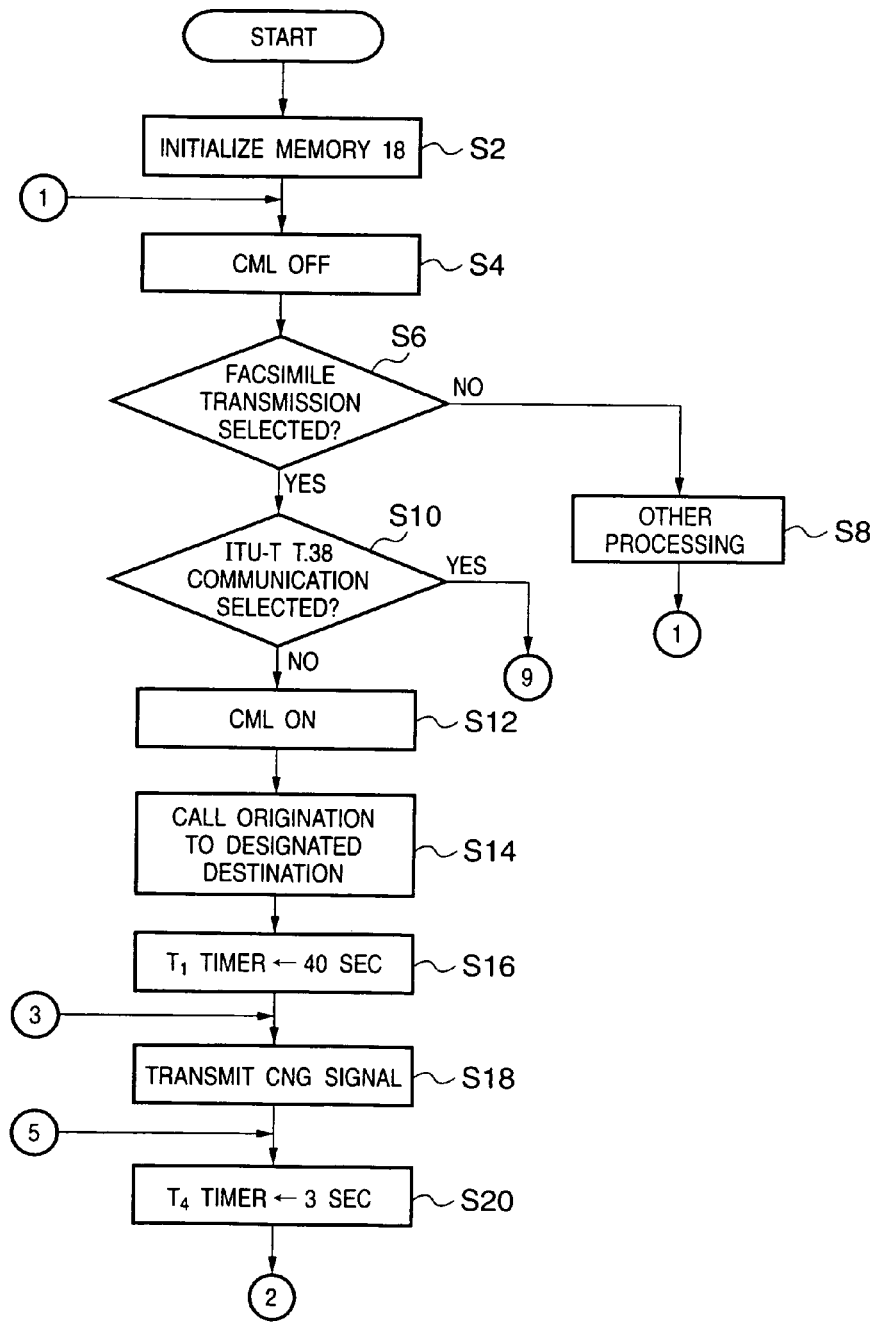
FIGS. 3 to 7 are flowcharts showing a processing procedure of the facsimile apparatus according to the first embodiment.
Figure 4:
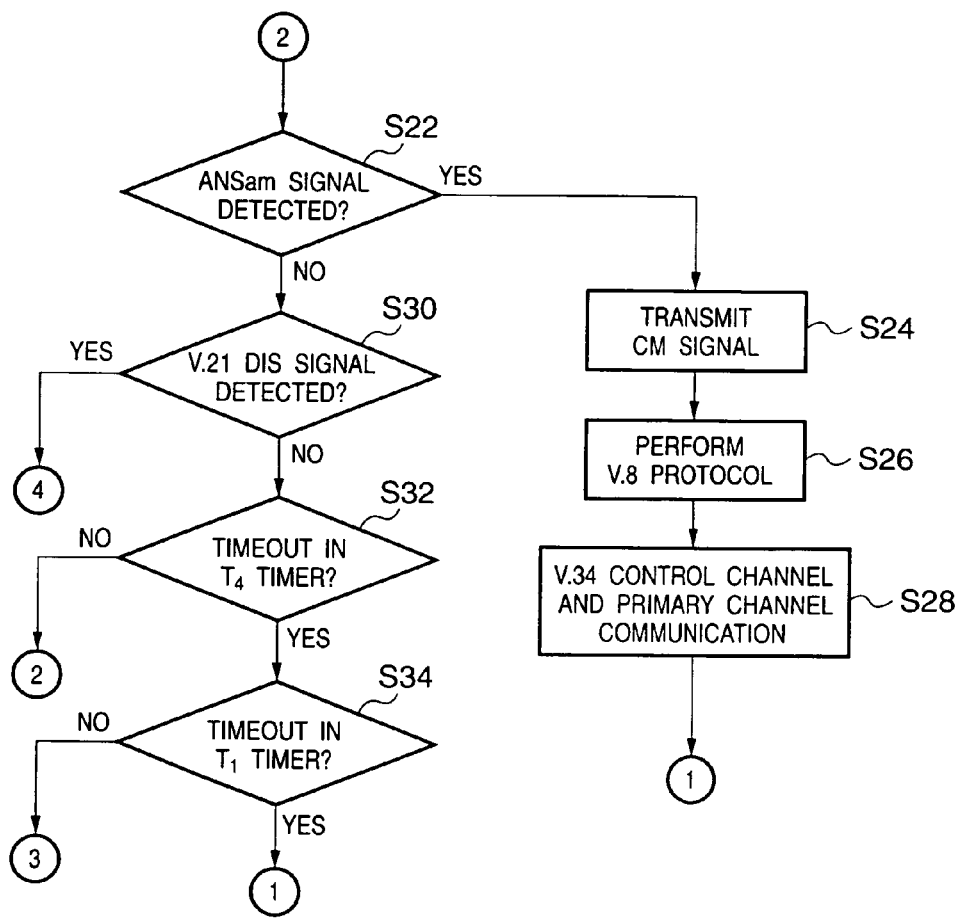
Figure 5:
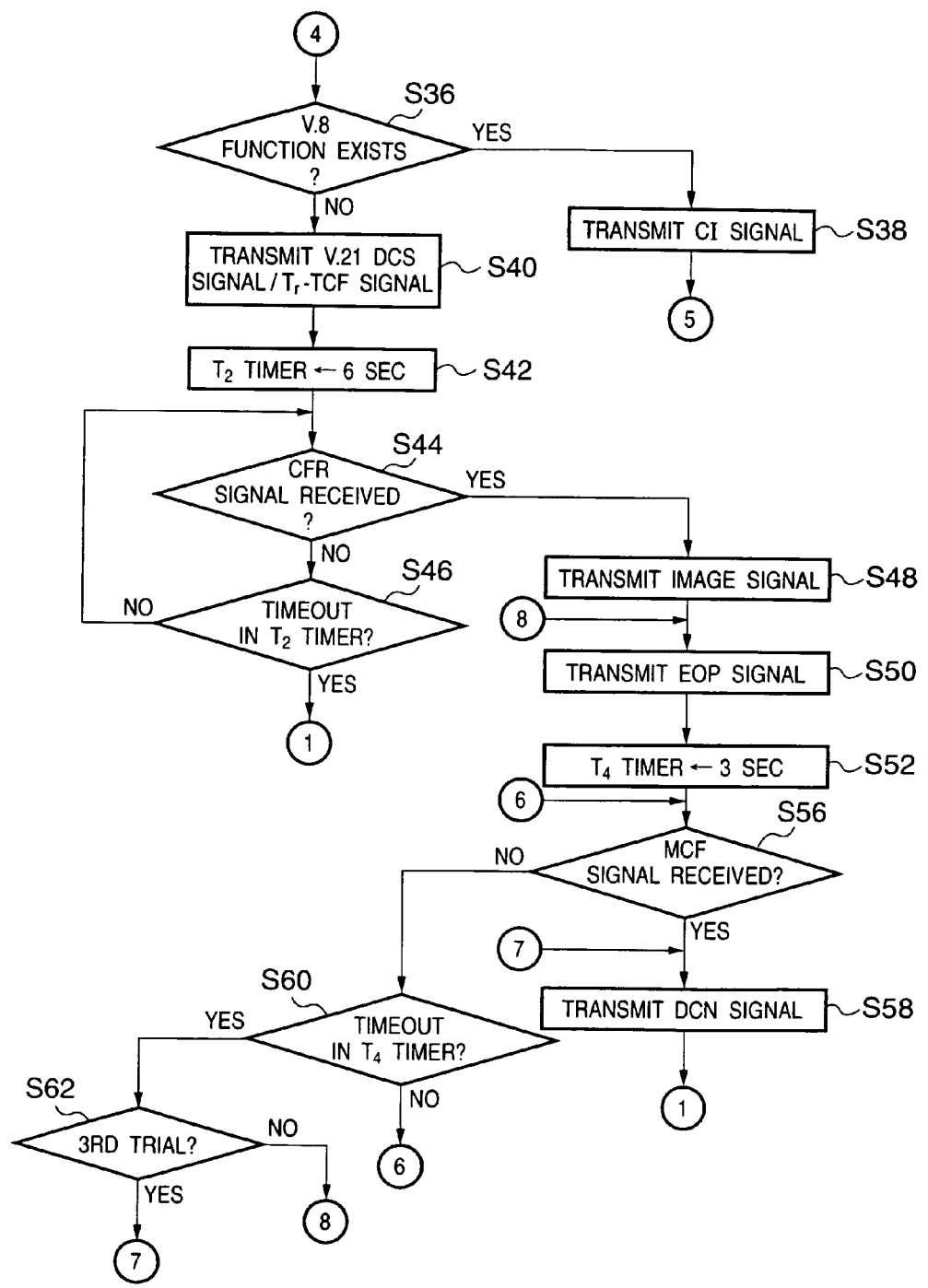
Figure 6:
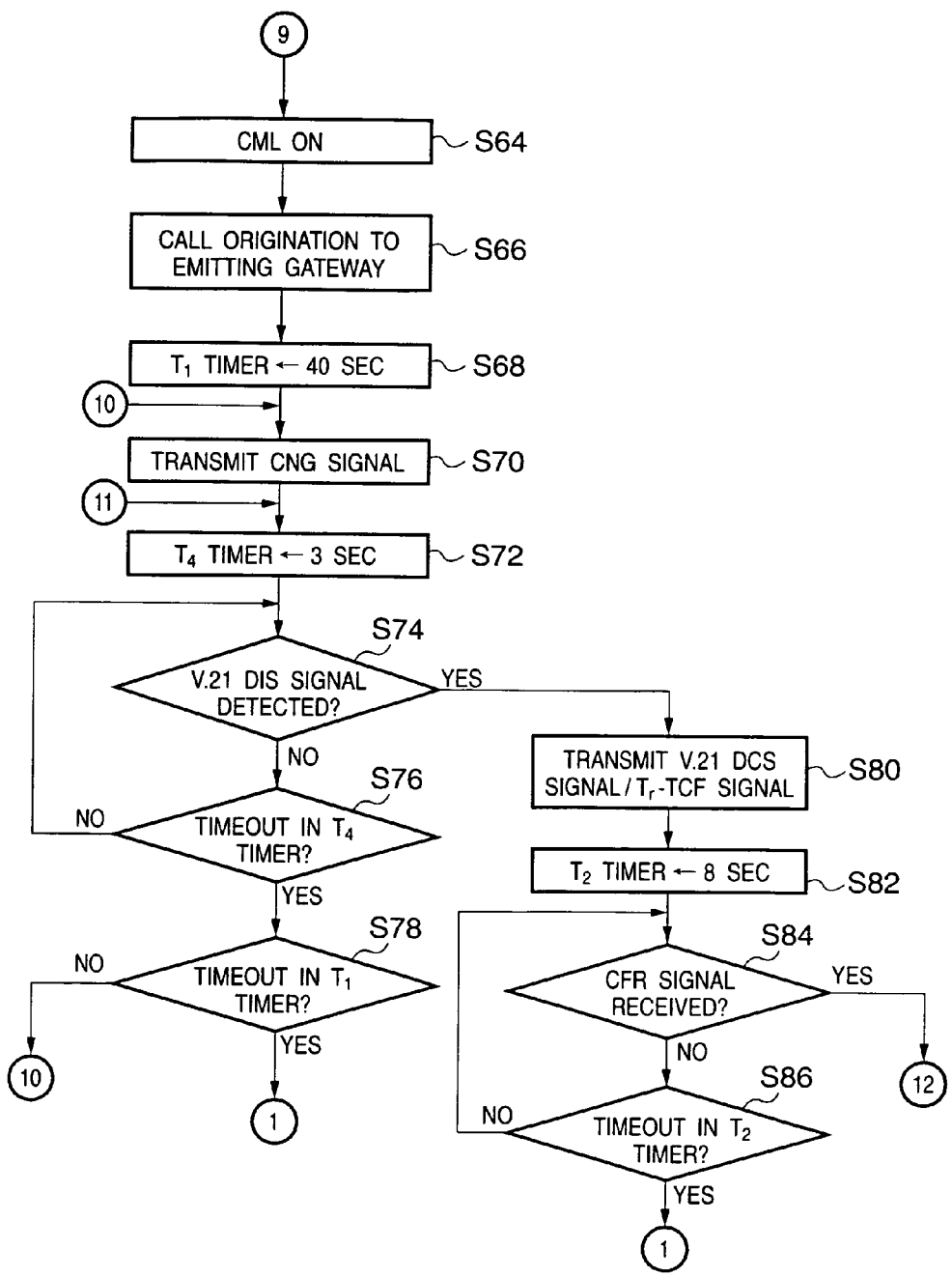
Figure 7:
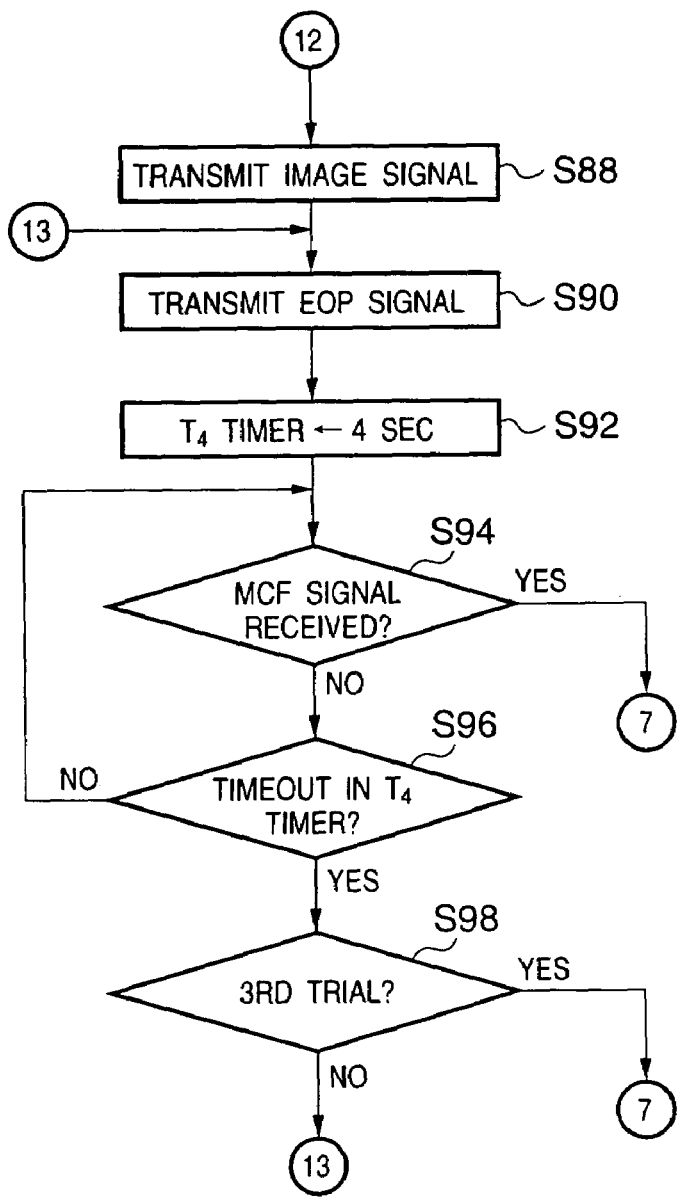

When the processing is started, at step S2 in FIG. 3, the memory 18 is initialized via the bus 26. Next, at step S4, the CML of the NCU 2 is turned off via the bus 26. Then at step S6, it is determined whether or not facsimile transmission has been selected, and if YES, the process proceeds to step S10, while if NO, proceeds to step S8 where other processing is performed. At step S10, information from the operation unit 20 is inputted via the bus 26, and it is determined whether or not communication based on ITU-T Recommendation T.38 has been selected. If YES, the process proceeds to step S64, while if NO, proceeds to step S12. At step S12, the CML of the NCU 2 is turned on via the bus 26. Further, at step S14, a call origination is made by the call origination circuit 10 via the bus 26 to a designated destination.

At this time, at step B16, the T1 timer is set to 40 sec, and at step S18, a CNG signal (call origination tone) is transmitted, further, at step S20, the T4 timer is set to 3 sec. Next, at step S22, it is determined whether or not an ANSam signal has been detected. If YES, the process proceeds to step S24, at which a CM signal is transmitted, and the process proceeds to step S26. If NO at step S22, the process proceeds to step S30. At step S26, the V.8 protocol is performed. Further, at step S28, V.34 control channel and primary channel communication is performed, in conformance with the ITU-T Recommendation T.30. That is, the T2 timer is set to 6 sec, and the T4 timer is set to 3 sec (not shown in the flowchart).

On the other hand, at step S30, it is determined whether or not a V.21 DIS signal has been detected, and if YES, the process proceeds to step S36, while if NO, proceeds to step S32. At step S32, it is determined whether or not timeout has occurred in the T4 timer, and if YES, the process proceeds to step S34, while if NO, proceeds to step S22.

At step S34, it is determined whether or not timeout has occurred in the T1 timer, and if YES, the process proceeds to step S4, while if NO, proceeds to step S18.

At step S36, it is determined by the V.21 DIS signal whether or not the opposite-end machine has a V.8 function, and if YES, the process proceeds to step S38 to move to transmission of CI signal, while if NO, proceeds to step S40 at which transmission of a V.21 DCS signal/Tr-TCF signal is performed. At step S42, the T2 timer is set to 6 sec.

At step S44, it is determined whether or not a CFR signal has been received, and if YES, the process proceeds to step S48, while if NO, proceeds to step S46.

At step S46, it is determined whether or not timeout has occurred in the T2 timer. The processing at step S44 is repeated until timeout occurs, then upon occurrence of timeout, the process proceeds to step S4.

At step S48, an image signal is transmitted, and at step S50, an EOP signal is transmitted. At step S52, the T4 timer is set to 3 sec. At step S56, it is determined whether or not an MCF signal has been received, and if YES, the process proceeds to step S58 at which a DCN signal is transmitted, while if NO, the process proceeds to step S60.

At step S60, it is determined whether or not timeout has occurred in the T4 timer, and if YES, the process proceeds to step S62, while if NO, returns to step S56 to repeat the determination.

At step S62, it is determined whether or not the current transmission is made as the 3rd trial, and if YES, the process proceeds to step S58, while if NO, proceeds to step S50.

Step S64, the CML of the NCU 2 is turned on.

At step S66, call origination is made by the call origination circuit 10 via the bus 26 to the emitting gateway. Further, at step S68, the T1 timer is set to 40 sec. At step S70, the T4 timer is set to 3 sec.

At step S74, it is determined whether or not the V.21 DTS signal has been detected, and if YES, the process proceeds to step S80 at which the V.21 DCS signal/Tr-TCF signal is transmitted, while if NO, proceeds to step S76.

At step S76, it is determined whether or not timeout has occurred in the T4 timer, and if YES, the process proceeds to step S78, while if NO, proceeds to step S74.

At step S78, it is determined whether or not timeout has occurred in the T1 timer, and if YES, the process proceeds to step S4, while if NO, proceeds to step S70.

At step S82, the T2 timer is set to 8 sec.

At step S84, it is determined whether or not the CFR signal has been received, and if YES, the process proceeds to step S88, while if NO, proceeds to step S86.

At step S86, it is determined whether or not timeout has occurred in the T2 timer. If YES, the process proceeds to step S4, while if NO, proceeds to step S84.

At step S88, the image signal is transmitted, and at step S90, the EOP signal is transmitted.

At step S92, the T4 timer is set to 4 sec.

At step S94, it is determined whether or not the MCF signal has been received, and if YES, the process proceeds to step S58, while if NO, the process proceeds to step S96.

At step S96, it is determined whether or not timeout has occurred in the T4 timer, and if YES, the process proceeds to step S98, while if NO, proceeds to step S94.

At step S98, it is determined whether or not the current transmission is made as the 3rd trial, and if YES, the process proceeds to step S58, while if NO, proceeds to step S90.

According to the present embodiment, upon execution of realtime facsimile communication via the Internet in conformity with the ITU-T Recommendation T.38, the communication speed can be set to a rather low speed or allowable delay time can be set to a longerddddddd period, thereby the probability of success of realtime facsimile communication via the Internet can be increased, and excellent operability can be provided to users.

Second Embodiment

Next, the facsimile apparatus according to a second embodiment of the present invention will be described with reference to FIGS. 8 to 10.

In the present embodiment, in addition to the above-described first embodiment, the facsimile apparatus performs processing to determine whether or not facsimile communication via the Internet in conformity with the ITU-T Recommendation T.38 is to be performed, based on information inputted by a user. Hereinbelow, description will be made on a particular example of control for discrimination of call destination upon call origination and call originator telephone number information upon reception of an incoming call, to determine whether or not facsimile communication via the Internet based on the ITU-T Recommendation T.38 is to be performed.

Since the processings at the other steps are the same as those in FIG. 3, the steps have the same reference numerals and the explanations of the steps will be omitted.

Figure 8:
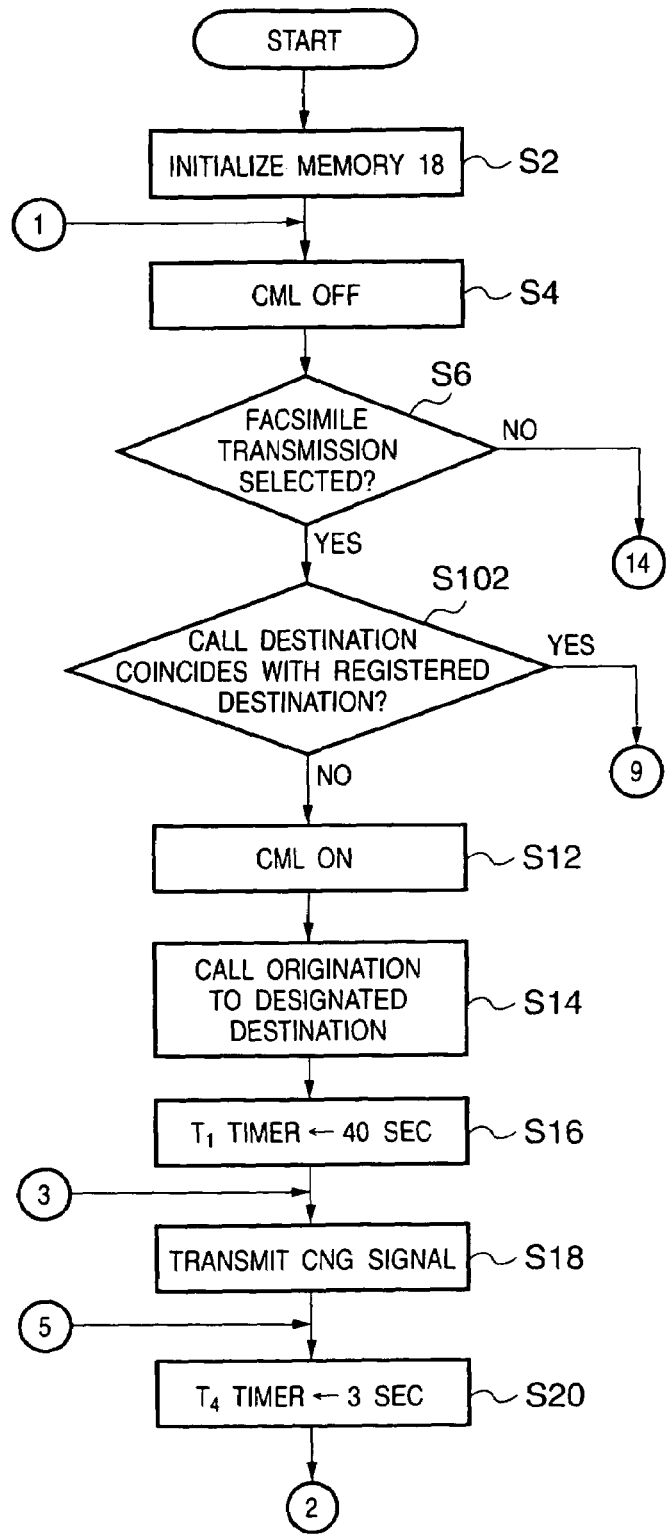
FIGS. 8 to 10 are flowcharts showing a processing procedure of the facsimile apparatus according to a second embodiment of the present invention.

In FIG. 8, if facsimile transmission has been selected (YES) at step S6, the process proceeds to step S102, where it is determined whether or not a call destination coincides with a destination registered in the destination registration area 28. If YES, the process proceeds to step S64 in FIG. 6, while if NO, proceeds to step S12. Further, if NO at step S6, the process proceeds to step S110 in FIG. 9.

Figure 9:
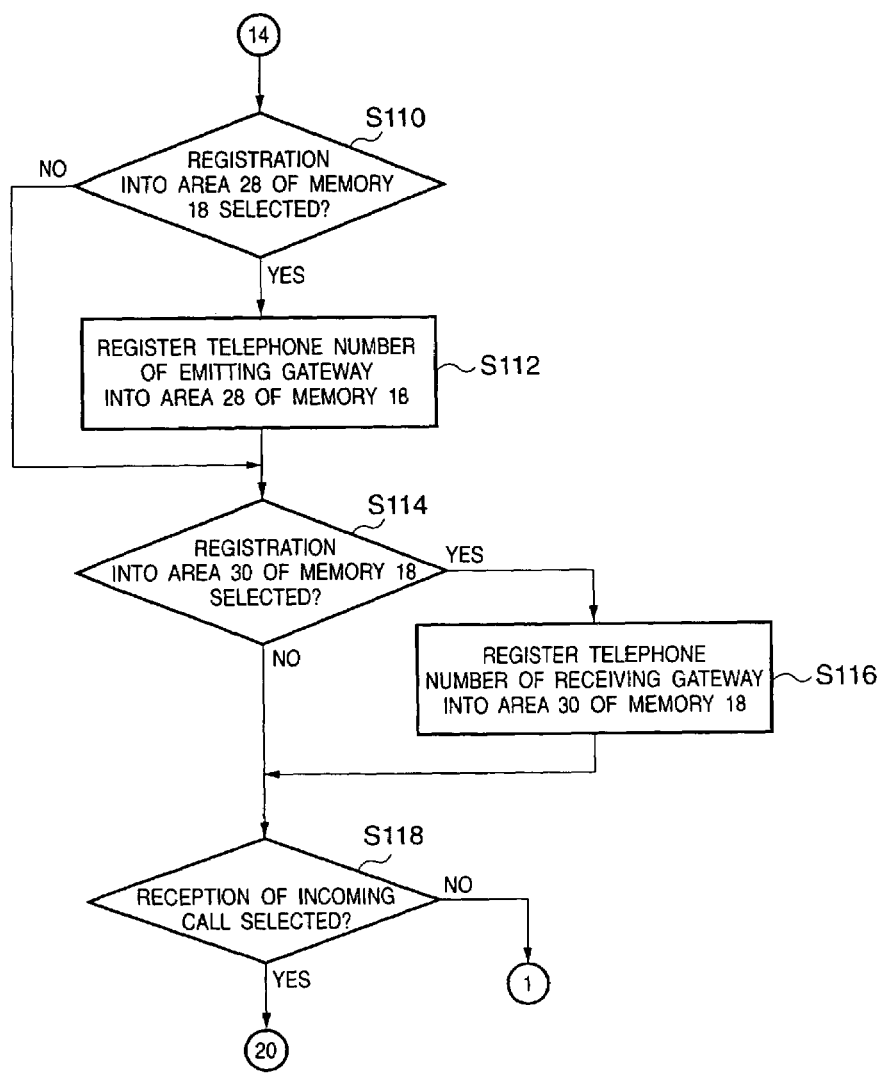

At step S110 in FIG. 9, information from the operation unit 20 is inputted via information on the bus 26, and it is determined whether or not registration into the destination registration area 28 has been selected. If YES, the process proceeds to step S112, at which the telephone number of the emitting gateway is registered into the destination registration area 28, while if NO, the process proceeds to step S114.

At step S114, information from the operation unit 20 is inputted via the bus 26, and it is determined whether or not registration into the originator number registration area 30 has been selected. If YES, the process proceeds to step S116, at which the telephone number of the receiving gateway is registered into the originator number registration area 30, while if NO, the process proceeds to step S118.

At step S118, it is determined whether or not reception of incoming call has been selected, and if YES, the process proceeds to step S122, while If NO, returns to step S4.

Figure 10:
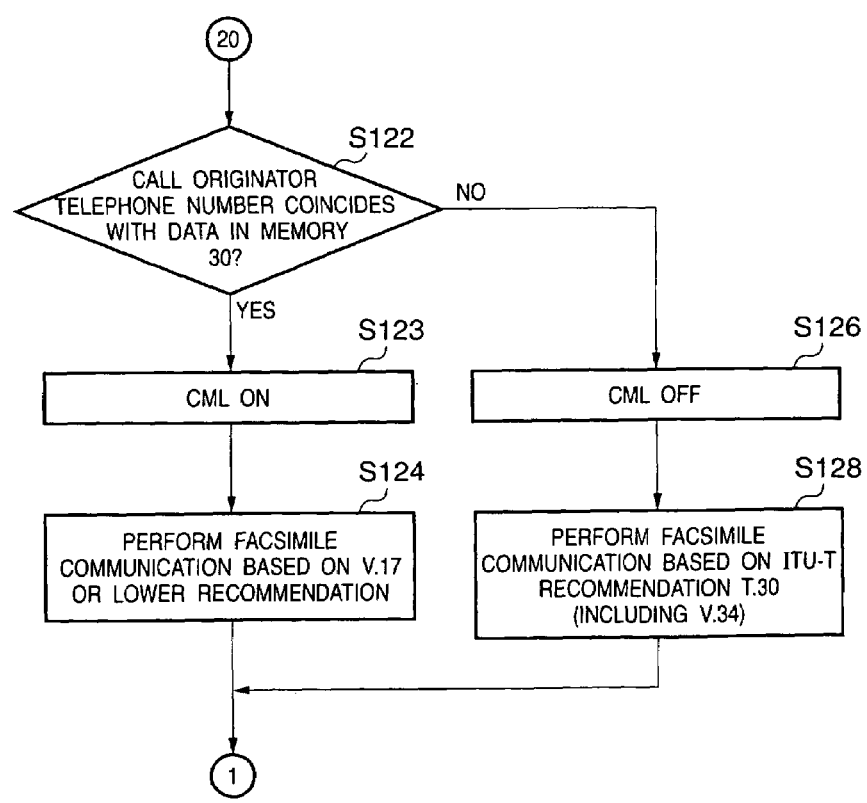

At step S122 in FIG. 10, it is determined whether or not a call originator telephone number detected via the bus 26 coincides with a telephone number registered in the originator number registration area 30, and if YES, the process proceeds to step S123, while if NO, proceeds to step S126.

At step S123, the CML of the NCU 2 is turned on.

At step S124, the T4 timer is set to 4 sec and the T2 timer is set to 8 sec, and facsimile reception of V.17 or lower recommendation is performed.

At step S126, the CML of the NCU 2 is turned on via the bus 26.

At step S128, facsimile reception based on the ITU-T Recommendation T.30 including Recommendation V.34 is performed. The T2 time is set to 6 sec, and the T4 time is set to 3 sec.

When processing at step S124 or step S128 is completed, the process returns to step S4.

According to the present embodiment, it not necessary to set facsimile communication via the Internet in conformity with the ITU-T Recommendation T.30 upon each communication. Further, upon reception of incoming call, it can be determined whether or not the facsimile communication via the Internet in conformity with the ITU-T Recommendation T.38 is to be performed. Thus appropriate facsimile communication control is realized, and excellent operability is provided to the users.

Other Embodiment

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium (or recording medium) storing software program code for performing the aforesaid processes to a system or an apparatus, reading the program code with a computer (e.g., CPU, MPU) of the system or apparatus from the storage medium, then executing the program. In this case, the program code read from the storage medium realizes the functions according to the embodiments, and the storage medium storing the program code constitutes the invention.

Furthermore, besides aforesaid functions according to the above embodiments are realized by executing the program code which is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

As described above, according to the above embodiments, a communication method and a communication apparatus enabling smooth facsimile data transmission in any of facsimile communication via the Internet or facsimile communication without the Internet can be provided.

As many apparently widely different embodiments of the present invention can be made without departing from the spirit and scope thereof, it is to be understood that the invention is not limited to the specific embodiments thereof except as defined in the appended claims.

What is claimed is:

1. A communication method for selectively performing real-time facsimile communication via the Internet and facsimile communication without the Internet,
    wherein a communication parameter is changed based on whether the real-time facsimile communication via the Internet or the facsimile communication without the Internet is to be performed, the parameter being allowable delay time.

2. The communication method according to claim 3, wherein said parameter is a transmission speed for the communication.

3. The communication method according to claim 1, further comprising a detection step of detecting whether the facsimile communication via the Internet or the facsimile communication without the Internet is to be performed.

4. A communication method for selectively performing real-time facsimile communication via the Internet and facsimile communication without the Internet comprising steps of:
    determining whether the facsimile communication via the Internet or the facsimile communication without the Internet is to be performed, based on information inputted by a user, wherein said determination step, upon reception of an incoming call, includes determining whether the facsimile communication via the Internet or the facsimile communication without the Internet is to be performed, based on originator telephone number information,
    wherein a communication parameter is changed based on whether the real-time facsimile communication via the Internet or the facsimile communication without the Internet is to be performed.

5. The communication method according to claim 4, wherein said determination step, upon calling origination, includes determining whether the facsimile communication via the Internet or the facsimile communication without the Internet is to be performed, based on a call destination.

6. A communication apparatus capable of real-time facsimile communication via the Internet, comprising:
    communication unit, adapted to perform communication; and
    changing means for changing a communication parameter used by said communication unit, based on whether the real-time facsimile communication via the Internet or facsimile communication without the Internet is to be performed,
    wherein said parameter is allowable delay time.

7. The communication apparatus according to claim 6, wherein said parameter is a transmission speed for the communication.

8. The communication apparatus according to claim 6, further comprising detection means for detecting whether the facsimile communication via the Internet or the facsimile communication without the Internet is to be performed.

9. A communication apparatus capable of realtime communication via the Internet, comprising:
    communication unit, adapted to perform communication; and
    changing means for changing a communication parameter used by said communication unit, based on whether the real time facsimile communication via the Internet or facsimile communication without the Internet is to be performed; and
    determination means for determining whether the facsimile communication via the Internet or the facsimile communication without the Internet is to be performed, based on information inputted by a user,
    wherein upon reception of an incoming call, said determination means determines whether the facsimile communication via the Internet or the facsimile communication without the Internet is to be performed, based on originator telephone number information.

10. The communication apparatus according to claim 9, wherein upon call origination, said determination means determines whether the facsimile communication via the Internet or the facsimile communication without the Internet is to be performed, based on a call destination.

11. A computer-readable memory holding a communication program for selectively executing real-time facsimile communication via the Internet and facsimile communication without Internet,
    said communication program including a program to change a communication parameter based on whether the real-time facsimile communication via the Internet or the facsimile communication without Internet is to be performed,
    wherein said parameter is allowable delay time.

12. A computer-readable memory holding a communication program for selectively executing real-time facsimile communication via the Internet and facsimile communication without Internet,
    said communication program includes a program to determine whether the facsimile communication via the Internet or the facsimile communication without the Internet is to be performed, based on information inputted by a user, wherein said program, upon reception of incoming call, determines whether the facsimile communication via the Internet or the facsimile communication without the Internet is to be performed, based on originator telephone number information,
    wherein a communication parameter is changed based on whether the real-time facsimile communication via the Internet or the facsimile communication without the Internet is to be performed.

* * * * *

UNITED STATES PATENT AND TRADEMARK OFFICE
CERTIFICATE OF CORRECTION

| | |
|---|---|
| PATENT NO. | : 7,057,755 B2 |
| APPLICATION NO. | : 09/759232 |
| DATED | : June 6, 2006 |
| INVENTOR(S) | : Takehiro Yoshida |

Page 1 of 1

It is certified that error appears in the above-identified patent and that said Letters Patent is hereby corrected as shown below:

ON THE TITLE PAGE [30]:

Foreign Application Priority Data, "Jan. 20, 2002 (JP) .... 2000-012125" should read --Jan. 20, 2000 (JP) .... 2000-012125--.

COLUMN 5:

Line 46, "longerdddddddd" should read --longer--.

COLUMN 8:

Line 19, "and" should be deleted;
Line 42, "Internet," should read --the Internet,--;
Line 46, "Internet" should read --the Internet--; and
Line 52, "Internet," should read --the Internet,--.

Signed and Sealed this

Thirteenth Day of February, 2007

JON W. DUDAS
*Director of the United States Patent and Trademark Office*